March 29, 1932.  E. E. GAMON  1,851,506
WATER METER
Filed Dec. 28, 1929

INVENTOR
Ernest E. Gamon
BY
Frank C. Fischer
ATTORNEY

Patented Mar. 29, 1932

1,851,506

UNITED STATES PATENT OFFICE

ERNEST E. GAMON, OF PRINCESBAY, NEW YORK

WATER METER

Application filed December 28, 1929. Serial No. 417,130.

This invention relates to water meters, and more particularly to means for preventing excessive expansion of pistons used in such meters.

In water meters of the positive or displacement type in which the piston oscillates about one or more conical surfaces placed in a hollow sphere, or oscillates inside of a cylinder, the piston or moving member is commonly made of hard rubber, which is peculiarly adapted for this use, for the reason that it has practically the same specific gravity as the water which it displaces.

Also the hard rubber piston has bearings on the bronze measuring chamber of the meter, and the cold water passing therethrough seems to act as a lubricant between the bronze seat and the hard rubber piston, this combination giving the desired sensitiveness necessary for successful measurement of low flows of little energy.

Also, it is apparent that the amount of clearance between the piston or moving member and the walls of the measuring chamber must be very small to prevent water from leaking past.

With the usual methods of generating hot water, the hot water frequently works back through the cold water supply pipe into the meter. The commercial hard rubber piston of the meter is expanded and softened by the heat, and is forced against the walls of the chamber, becoming deformed and rendered inoperative.

In the common house size, the diameter of a meter piston is about three inches, and the allowable clearance is usually two one-thousandths of an inch. Experiments have demonstrated that a three-inch piston made of commercial hard rubber will usually expand about fifteen one-thousandths of an inch during a rise in temperature from ninety degrees to 212 degrees Fahrenheit; and the bronze measuring chamber will expand about two one-thousandths of an inch during the same rise in temperature.

It is an object of this invention to provide a disk piston for water meters, having means by which expansion is limited over a large range of temperatures.

This and other advantages are attained by the novel construction, combination and arrangement of parts hereinafter described and shown in the accompanying drawings, constituting a material part of this disclosure and in which.

Figure 1:
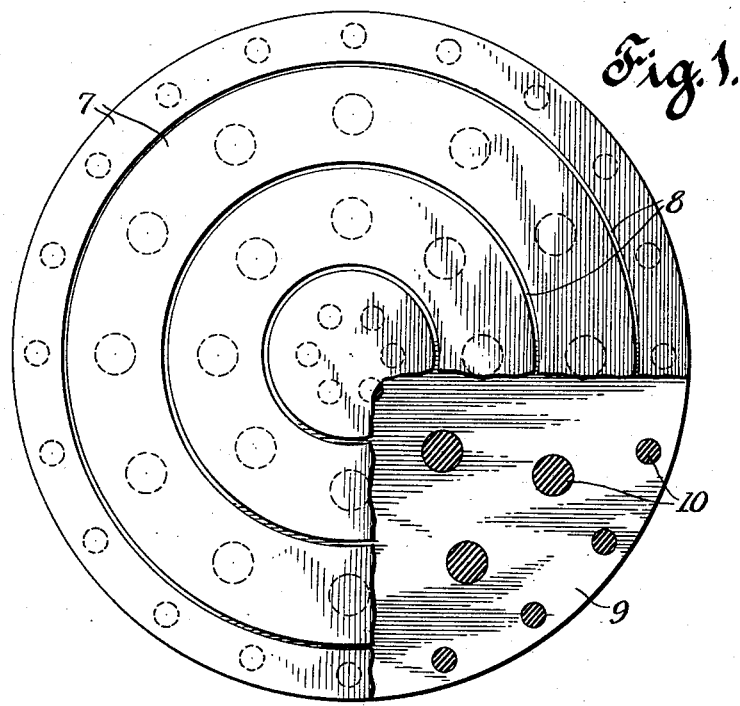
Figure 1 represents a plan view of a disk piston embodying the invention.
Figure 2:
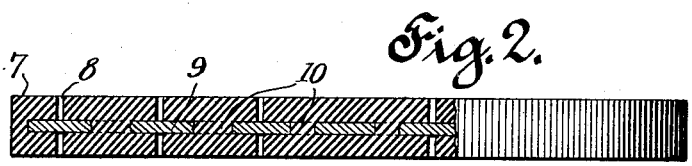
Figure 2 represents a sectional view of the piston shown in Figure 1.

Referring to the drawings, in Figure 1, a disk piston 7 is shown to be made of hard rubber formed in annular sections separated by air spaces 8. Embedded in the rubber sections is a metallic disk 9, preferably of aluminum, having a plurality of holes 10 through which the rubber flows to hold the sections in their relative positions. When such a disk piston is used in hot water, it will be seen that each section of rubber expands independently of the others, and the resulting expansion of the disk as a whole is negligible.

Figure 3:
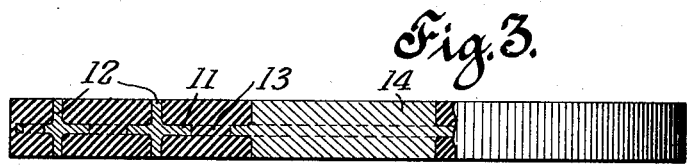
Figure 3 represents a sectional view of a modified form of piston.

In the modified form shown in Figure 3, a metal insert 11, has a plurality of spaced annular flanges projecting outwardly from each side thereof, and the disk is provided with a plurality of holes 13 through which the rubber flows. The flanges 12 project to the surfaces of the rubber disk and separate the annular sections in much the same manner as they are separated by the air spaces 8 shown in Figure 1, so that the expansion of each rubber section is independent.

Figure 4:
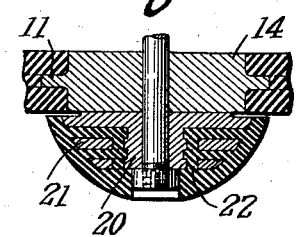
Figure 4 represents a sectional view of a modified form of an element such as shown in Figure 5.

A bearing sphere, such as shown in Figure 4, is usually attached to the disk, and for that purpose the metal insert 14 is provided with a center portion equal in thickness to that of the rubber sections.

Figure 5:
Figure 5 represents a sectional view of an element of a water meter disk piston embodying the invention.

In Figure 5 is shown one form of a metal insert for a bearing sphere such as is commonly used in connection with disk pistons, the metal insert being provided with a tubular bearing 19 to receive a spindle.

In Figure 4 is shown another form of metal insert for a bearing sphere, the metal insert having a center bearing 20 for a spindle, and flanges 21 projecting therefrom. The main portion of the sphere is formed of rubber which is held between the flanges 21 and in holes 22 therein.

While it has been known heretofore to provide metal inserts for disk pistons, such inserts were provided solely for the purpose of strengthening the pistons and preventing breakage due to sudden shocks, and were not adapted for preventing expansion of the disk piston when used in varying temperatures.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention, what I claim as new and desire to secure by Letters Patent, is:

1. A water meter piston, comprising an insert plate of material having a low coefficient of expansion compared with rubber, a plurality of independent spaced apart sections of rubber covering said plate, said plate having perforations and means in said perforations to maintain the relative positions of said sections of rubber.

2. A water meter piston, comprising an insert plate of material having a low coefficient of expansion compared with rubber, a plurality of flanges projecting from the sides of said plate, and a plurality of sections of rubber covering the plate, said flanges preventing intimate contact between the sections of rubber.

3. A water meter piston of the disk type, comprising an insert plate of metal having a low coefficient of expansion compared with rubber, and a plurality of independent spaced apart annular sections of rubber covering said plate, said plate having a plurality of holes into which the rubber enters so that the relative positions of said sections will be maintained.

4. A water meter piston of the disk type, comprising an insert plate of metal having a low coefficient of expansion compared with rubber, a plurality of annular flanges projecting from the sides of said plate, and sections of rubber positioned between said flanges and covering the plate, the flanges preventing intimate contact between the rubber sections.

5. A water meter piston of the disk type, comprising a metal plate having a plurality of holes, a plurality of concentric annular sections of rubber covering the plate, the rubber entering the holes in the plate to maintain the sections spaced from each other.

This specification signed this 14th day of November, 1929.

ERNEST E. GAMON.